US009948384B1

(12) United States Patent
Morara et al.

(10) Patent No.: US 9,948,384 B1
(45) Date of Patent: Apr. 17, 2018

(54) IDENTIFYING NETWORK FAULTS

(71) Applicant: Google Inc., Mountain View, CA (US)

(72) Inventors: Michele Morara, San Jose, CA (US); Raphael Cendrillon, Mountain View, CA (US)

(73) Assignee: Google LLC, Mountain View, CA (US)

(*) Notice: Subject to any disclaimer, the term of this patent is extended or adjusted under 35 U.S.C. 154(b) by 0 days.

(21) Appl. No.: 15/360,616

(22) Filed: Nov. 23, 2016

(51) Int. Cl.
H04B 10/079 (2013.01)
H04B 10/03 (2013.01)
H04B 10/272 (2013.01)

(52) U.S. Cl.
CPC ......... H04B 10/03 (2013.01); H04B 10/0791 (2013.01); H04B 10/272 (2013.01)

(58) Field of Classification Search
CPC ... H04B 10/03; H04B 10/0791; H04B 10/272
See application file for complete search history.

(56) References Cited

U.S. PATENT DOCUMENTS

| | | | | |
|---|---|---|---|---|
| 9,722,861 B2 * | 8/2017 | Bejerano | | H04L 41/0659 |
| 2002/0128751 A1 * | 9/2002 | Engstrom | | G05B 13/027 |
| | | | | 701/1 |
| 2002/0159397 A1 * | 10/2002 | Perkinson | | H04L 47/10 |
| | | | | 370/256 |
| 2004/0042473 A1 * | 3/2004 | Park | | H04L 45/00 |
| | | | | 370/408 |
| 2006/0080417 A1 * | 4/2006 | Boutboul | | H04L 41/12 |
| | | | | 709/220 |
| 2006/0136403 A1 * | 6/2006 | Koo | | G06F 17/30699 |
| 2006/0140411 A1 * | 6/2006 | Zhu | | H04L 9/0822 |
| | | | | 380/277 |
| 2007/0174089 A1 * | 7/2007 | Koo | | G06Q 10/087 |
| | | | | 705/2 |
| 2008/0212496 A1 * | 9/2008 | Zou | | H04L 12/18 |
| | | | | 370/255 |
| 2009/0063556 A1 * | 3/2009 | Nemoto | | G06F 17/30079 |
| 2011/0110270 A1 * | 5/2011 | Leng | | H04B 7/2606 |
| | | | | 370/254 |
| 2011/0159467 A1 * | 6/2011 | Peot | | A61B 3/113 |
| | | | | 434/157 |
| 2013/0128720 A1 * | 5/2013 | Kim | | H04L 43/0817 |
| | | | | 370/218 |

(Continued)

*Primary Examiner* — Danny Leung
(74) *Attorney, Agent, or Firm* — Honigman Miller Schwartz and Cohn LLP

(57) ABSTRACT

A method of identifying network faults includes receiving subscriber statuses of customer premises equipment (CPE) of a communication network represented as a tree having a root node and leaf nodes. Each leaf node corresponds to a CPE. For each CPE, the method includes: (i) determining a conditional probability of the subscriber status of the CPE for each sub-tree in the network tree; (ii) determining a joint probability of the subscriber status of the CPE for every sub-tree in the network tree; (iii) determining a joint probability of the subscriber status of the CPE for every residual tree in the network tree; and (iv) determining a Bayesian posterior probability of a cut at each leaf node, given the subscriber status of the CPE. The method further includes determining a network node status topology indicating node statuses of nodes of the network tree based on the determined Bayesian posterior probabilities.

20 Claims, 7 Drawing Sheets

(56) References Cited

U.S. PATENT DOCUMENTS

| | | | |
|---|---|---|---|
| 2014/0222813 A1* | 8/2014 | Yang | G06F 17/30861 |
| | | | 707/736 |
| 2014/0269402 A1* | 9/2014 | Vasseur | H04L 45/302 |
| | | | 370/253 |
| 2015/0009808 A1* | 1/2015 | Bejerano | H04L 41/0659 |
| | | | 370/228 |
| 2015/0269490 A1* | 9/2015 | Stillinger | G06N 7/005 |
| | | | 706/52 |
| 2015/0280968 A1* | 10/2015 | Gates | G06F 11/0709 |
| | | | 714/37 |
| 2015/0288557 A1* | 10/2015 | Gates | G06F 11/0709 |
| | | | 714/37 |
| 2015/0288558 A1* | 10/2015 | Gates | H04L 41/0686 |
| | | | 714/57 |
| 2015/0364129 A1* | 12/2015 | Gonzalez-Dominguez | G10L 15/005 |
| | | | 704/251 |

* cited by examiner

IDENTIFYING NETWORK FAULTS

TECHNICAL FIELD

This disclosure relates to identifying network faults.

BACKGROUND

Modern telecommunication networks typically contain many thousands of individual components that connect in complex ways to route traffic from a source to a destination. A common challenge in these networks is executing a rapid diagnosis of network faults so that the faults can be repaired before they significantly impact user experience. In typical deployments today, network engineers in network operations center wait for complaints from subscribers in order to become aware of a service issue. This can typically take several hours to occur, leading to outage for subscribers for hours or even days, significantly degrading the user experience.

SUMMARY

Ideally, an automated system identifies network faults when they occur and alert network engineers to repair the network faults. Although a promising concept in principle, in practice this is extremely challenging, because user data may potentially traverse thousands of network elements when moving from a source to the user for consumption. As a result, it is challenging to determine which network element is responsible for a degradation in service to the user. Furthermore, in some networks, e.g., passive optical networks, the network elements are not powered and hence a state of the network elements cannot be automatically reported to a monitoring system. The unobservable state of these thousands of network elements makes diagnosis and root cause analysis of a user outage an extremely difficult, time intensive, and expensive task that typically must be done manually by highly experienced, specialist network engineers. The present disclosure provides systems and methods for determining network faults as they occur. The systems and methods implement, in some examples, a root cause analysis in a network having a tree topology.

One aspect of the disclosure provides a method of identifying network faults. The method includes receiving, at data processing hardware, subscriber statuses of a plurality of customer premises equipment (CPE) of a communication network. The communication network includes a network tree of communication paths between a root node and leaf nodes. Each leaf node corresponds to a CPE. Moreover, the network tree includes sub-trees, where each sub-tree includes a sub-tree root node and one or more child nodes in communication with the sub-tree root node. For each CPE, the method includes: (i) determining, by the data processing hardware, a conditional probability of the subscriber status of the CPE for each sub-tree in the network tree, assuming a communication cut at the corresponding sub-tree root node; (ii) determining, by the data processing hardware, a joint probability of the subscriber status of the CPE for every sub- tree in the network tree; (iii) determining, by the data processing hardware, a joint probability of the subscriber status of the CPE for every residual tree in the network tree, each residual sub-tree being the network tree minus a sub-tree; and (iv) determining, by the data processing hardware, a Bayesian posterior probability of a communication cut at each node, given the subscriber status of the CPE. The method further includes determining, by the data processing hardware, a network node status topology indicating node statuses of nodes of the network tree based on the determined Bayesian posterior probabilities.

Implementations of the disclosure may include one or more of the following optional features. In some implementations, the method includes receiving, at the data processing hardware, a heartbeat signal from each CPE and determining, by the data processing hardware, the subscriber status of each CPE based on the corresponding heartbeat signal of the CPE. In some examples, the subscriber status includes an operation state or a network state of the corresponding CPE.

In some implementations, the method includes determining, by the data processing hardware, a graphical representation of the network node status topology and displaying, by the data processing hardware, the graphical representation of the network node status topology on a screen in communication with the data processing hardware. A user may use the graphical representation of the network node status topology to discern issues with the communication network. In some examples, the method includes issuing, by the data processing hardware, a network correction command based the determined network node status topology. The network correction command is associated with at least one node of the network tree having a fault status.

The communication network may be a passive optical network (PON) and the CPEs may be optical line terminals. In such instances, nodes of the network tree correspond to passive optical devices, which are incapable of reporting back an operational status. The method allows identification of network faults (e.g., fiber cuts) within the network tree via a statistical analysis of the communication network based on the subscriber statuses.

In some examples, determining the conditional probability of the subscriber status of the CPE for each sub-tree in the network tree or determining the joint probability of the subscriber status of the CPE for every sub-tree in the network includes receiving a first input set. The first input set may include a node map defining pathways between node indices and leaf indices, a first vector defining an observed leaf state, a second vector defining prior probabilities, and a third vector defining child indices of each node. The nodes may be assumed to be breadth-first-search ordered. The first input set may further include a true-positive-rate associated with the observed leaf state and a true-negative-rate associated with the observed leaf state. The method may also include determining, based on the first input set, a fourth vector defining a conditional log-likelihood of the observed leaf state for every sub-tree assuming a communication cut in the sub-tree root node of the corresponding sub-tree and a fifth vector defining a log-likelihood of the observed leaf state for every sub-tree in the network tree.

Determining the joint probability of the subscriber status of the CPE for every residual tree in the network tree may include calculating receiving a second input set. The second input set may include the second vector, the third vector, the fourth vector, the fifth vector, and a sixth vector defining a parent index of each node. The method may also include determining, based on the second input set, a seventh vector defining the log-likelihood of the observed leaf state for every residual tree in the network tree.

In some implementations, determining the Bayesian probability of the communication cut at each node may include calculating receiving a third input set. The third input set may include the first vector, the second vector, the third vector, the fourth vector, the fifth vector, the sixth vector, and the seventh vector. The method may also include determining, based on the third input, set an eighth vector defining Bayesian posterior probabilities of node cuts, given the observed leaf state, for every node in the network tree.

Another aspect of the disclosure provides a system for identifying network faults. The system includes data processing hardware and memory hardware in communication with the data processing hardware. The memory hardware stores instructions that when executed on the data processing hardware cause the data processing hardware to perform operations. The operations include receiving subscriber statuses of a plurality of customer premises equipment (CPE) of a communication network. The communication network includes a network tree of communication paths between a root node and leaf nodes, each leaf node corresponding to a CPE. Each sub-tree includes a sub-tree root node and one or more child nodes in communication with the sub-tree root node. For each CPE, the operations include determining a conditional probability of the subscriber status of the CPE for each sub-tree in the network tree, assuming a communication cut at the corresponding sub-tree root node and determining a joint probability of the subscriber status of the CPE for every sub-tree in the network tree. For each CPE, the operations also include determining a joint probability of the subscriber status of the CPE for every residual tree in the network tree, each residual sub-tree being the network tree minus a sub-tree and determining a Bayesian posterior probability of a communication cut at each node, given the subscriber status of the CPE. The operations also include determining a network node status topology indicating node statuses of nodes of the network tree based on the determined Bayesian posterior probabilities.

In some examples, the operations further include receiving a heartbeat signal from each CPE and determining the subscriber status of each CPE based on the corresponding heartbeat signal of the CPE. The subscriber status may include an operation state or a network state of the corresponding CPE.

The operations may also include determining a graphical representation of the network node status topology and displaying the graphical representation of the network node status topology on a screen in communication with the data processing hardware. In some examples, the operations include issuing a network correction command based on the determined network node status topology, the network correction command associated with at least one node of the network tree having a fault status. The communication network may include a passive optical network and the customer premise equipment may include optical line terminals. At least one node of the network tree may correspond to a passive optical device.

Determining the conditional probability of the subscriber status of the CPE for each sub-tree in the network tree or determining the joint probability of the subscriber status of the CPE for every sub-tree in the network tree may include receiving a first input set. The first input set may include a node map defining pathways between node indices and leaf indices, wherein the nodes are assumed to be breadth-first-search ordered, a first vector defining an observed leaf state, and a second vector defining prior probabilities. The first input set may also include a third vector defining child indices of each node, a true-positive-rate associated with the observed leaf state, and a true-negative-rate associated with the observed leaf state. The system may also include determining, based on the first input set, a fourth vector defining a conditional log-likelihood of the observed leaf state for every sub-tree assuming a communication cut in the sub-tree root node of the corresponding sub-tree and a fifth vector defining a log-likelihood of the observed leaf state for every sub-tree in the network tree.

Determining the joint probability of the subscriber status of the CPE for every residual tree in the network tree may include calculating receiving a second input set. The second input set may include the second vector, the third vector, the fourth vector, the fifth vector, and a sixth vector defining a parent index of each node. The system may also include determining, based on the second input set, a seventh vector defining the log-likelihood of the observed leaf state for every residual tree in the network tree.

In some examples, determining the Bayesian posterior probability of the communication cut at each leaf node may include calculating receiving a third input set. The third input set may include the first vector, the second vector, the third vector, the fourth vector, the fifth vector, the sixth vector, and the seventh vector. The system may also include determining, based on the third input set, an eighth vector defining Bayesian posterior probabilities of node cuts, given the observed leaf state, for every node in the network tree.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
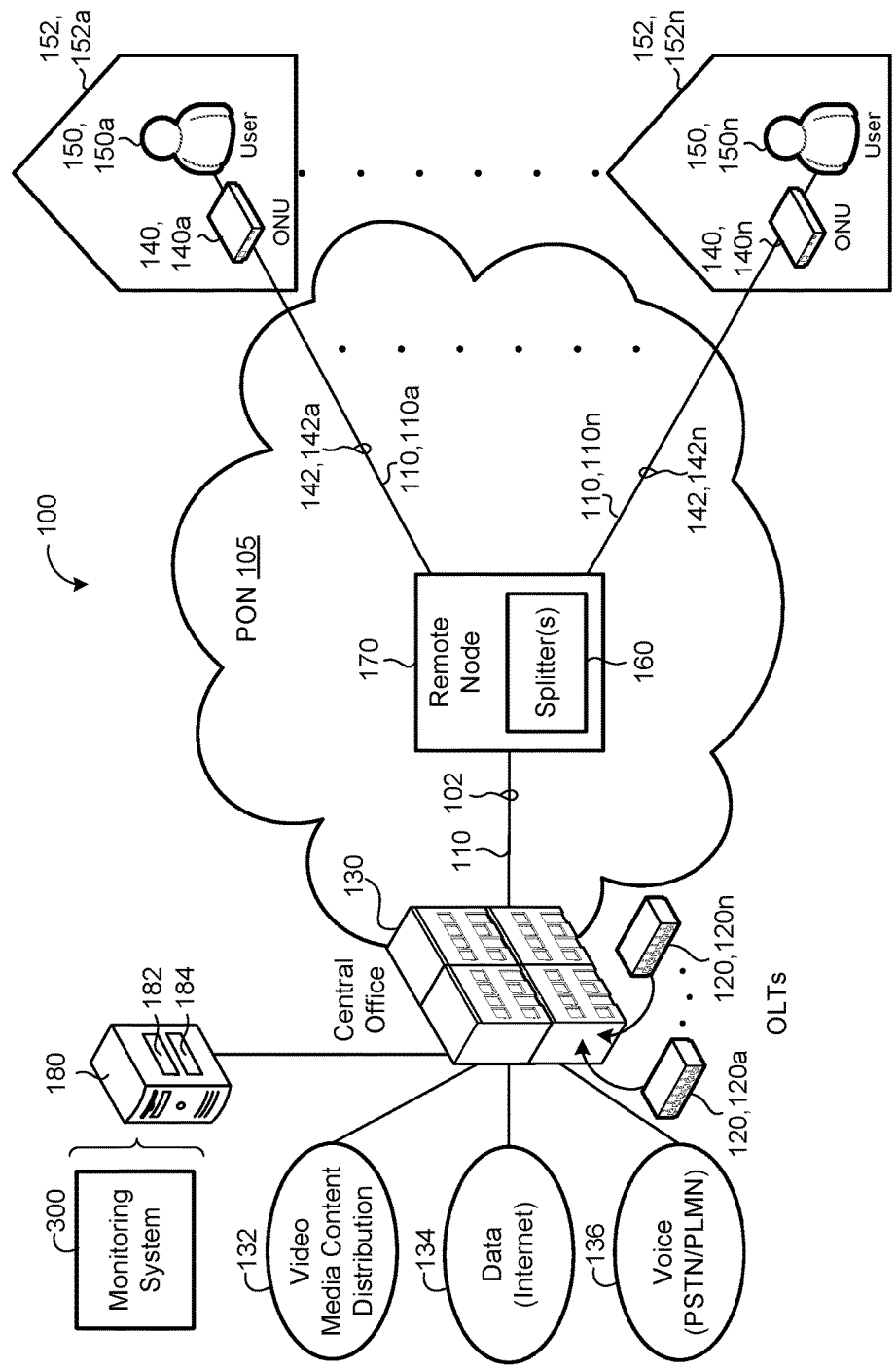
FIG. 1 is a schematic view of an example communication system.

Referring to FIG. 1, a communication system 100 delivers communication signals 102 (e.g., optical signals) through communication links 110, 110a-n (e.g., optical fibers or line-of-sight free space optical communications) between an optical line terminal (OLT) 120 housed in a central office (CO) 130 and optical network units (ONUs) 140, 140a-n (e.g., a bidirectional optical transceiver) associated with users 150, 150a-n (also referred to as customers or subscribers) and typically located at premises 152, 152a-n of the users 150, 150a-n. In some implementations, the optical communication system 100 implements a fiber-to-the-home (FTTH) system via a passive optical network (PON) 105. The PON 105 may be a point-to-multi-point time division multiplexed (TDM) PON, using one or more passive optical power splitters 160 at one or more remote nodes 170 to share a common OLT 120 (e.g., a transceiver) at the CO 130, or a point-to-point (pt-2-pt) TDM PON having direct connections, such as optical Ethernets, where a home-run optical link 110 (e.g., fiber) extends all the way back to an OLT 120 at the CO 130 and each customer 30, 30a-n is terminated by a separate OLT 120a-n, as opposed to the shared OLT 120.

The CO 130 receives information, such as video media distribution 132, internet data 134, and voice data 136 that may be transferred to the end users 150, 150a-n. The CO 130 includes at least one OLT 120 connecting the optical access network to an Internet Protocol (IP), Asynchronous Transfer Mode (ATM), or Synchronous Optical Networking (SONET) backbone, for example. Therefore, each OLT 120 is an endpoint of the PON 105 and converts between electrical signals used by service provider equipment and optic signals 102 used by the PON 105. The OLT 120 sends the optic signal 102 through a feeder fiber 110 to a remote node 170, which demultiplexes the optical signal 102 and distributes the demulitplexed signals 102 to multiple users 150, 150a-n. In some examples, each CO 130 includes multiple OLTs 120, 120a-n, and each OLT 120 is configured to service a group of users 150. In addition, each OLT 120 may be configured to provide signals in different services, e.g., one OLT 120 may provide services in 1G-PON, while another OLT 120 provides services in 10G-PON. When the CO 130 includes more than one OLT 120, the signals 102 of multiple OLT 120, 120a-n can be multiplexed to form a time-wavelength division multiplexed (TWDM) signal for delivery to the remote node 170. Multiplexing combines several input signals and outputs a combined signal having separate signals.

As shown in FIG. 1, the CO 130 multiplexes signals received from several sources, such as video media distribution 132, Internet data 134, and voice data 136, and multiplexes the received signals into one multiplexed signal 102 before sending the multiplexed signal 102 to the remote node 170 through the feeder fiber 110. The multiplexing may be performed by the OLT 120 or a broadband network gateway (BNG) positioned at the CO 130. Typically, most services are TDM multiplexed on the packet layer. The OLTs 120, 120a-n include a carrier source (e.g., a laser diode or a light emitting diode) for generating the optical signal 102. On the customers' end, i.e., at the ONU 140, a reverse process occurs. The ONU 140 may include a demultiplexer (DEMUX) that receives the multiplexed signal 102 and divides it into separate original signals that were originally combined. In some examples, the ONU 140 includes a photodetector that converts the optical wave to an electric form. The electrical signal may be further de-multiplexed down to subcomponents (e.g., data over a network, sound waves converted into currents using microphones and back to its original physical form using speakers, converting images converted into currents using video cameras and converting back to its physical form using a television). In TDM PONs, the demultiplexing of the signal generally occurs after the photodiode in the electrical domain. In a similar manner, the ONU 140, on the user end, includes a carrier source (e.g., laser diode or light-emitting diode) for generating an optical signal that carries the information to be sent from an end user 150 to the CO 130.

Customer premises equipment (CPE) is any terminal and associated equipment located at the premises 152 of the user 150 and connected to a carrier telecommunication channel at a demarcation point ("demarc"). In the examples shown, the ONU 140 is a CPE. The demarc is a point established in a house, building, or complex to separate customer equipment from service provider equipment. CPE generally refers to devices such as telephones, routers, switches, residential gateways (RG), set-top boxes, fixed mobile convergence products, home networking adapters, or Internet access gateways that enable the user 150 to access services of a communications service provider and distribute them around the premises 152 of the user 150 via a local area network (LAN).

The communication system 100 includes a monitoring system 300 for identifying network faults in the PON 105. The monitoring system 300 executes one on or more servers 180, each having data processing hardware 182 and optionally memory hardware 184 in communication with the data processing hardware 182. The one on or more servers 180 may be part of a cloud computing system (not shown) that is in communication with the communication system 100. The PON 105 includes network elements (e.g., the remote nodes 170), which are not powered, and hence states (e.g., an operation state or a network state) of all the network elements cannot be automatically reported to the monitoring system 300. Instead, in some implementations, the monitoring system 300 receives heart beat signals 142, 142a-n from the ONUs 140, 140a-n (also referred to as CPEs), determines a subscriber status of each ONU 140, and executes a probabilistic algorithm based on Bayesian statistics to implement a root cause analysis of service degradation or outage in communication system 100.

Figure 2:
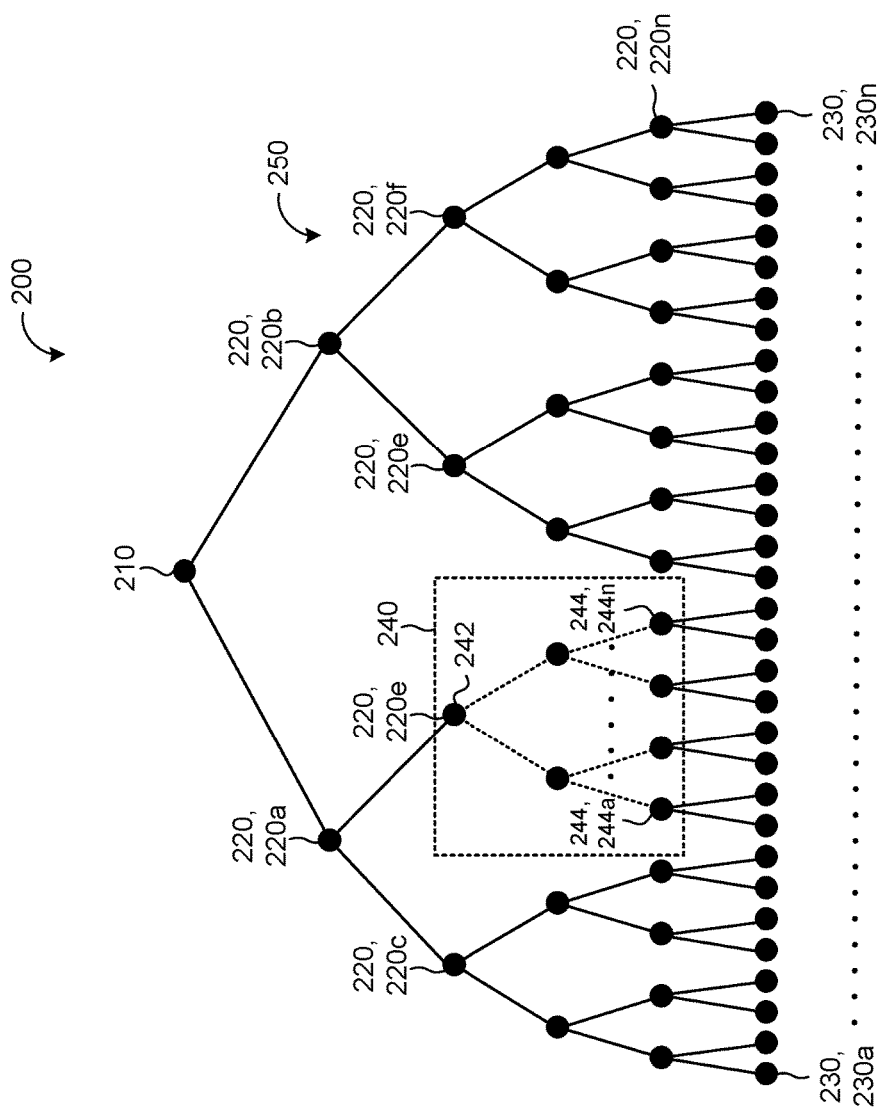
FIG. 2 is a schematic view of an example network tree.

Referring to FIGS. 1 and 2, a feeder fiber 110 carries communications between the CO 130 and a remote node 170, where a splitter 160 splits/combines optical signals 102 for distributed between the CO 130 and multiple ONUs 140a-140n. The communication links 110, 110a-n and remote nodes 170 of the communication system 100 form a communication network modeled as a network tree 200 of communication paths (e.g., communication links 110, 110a-n) from a root node 210 (e.g., an OLT 120) through intermediate nodes 220, 220a-n to leaf nodes 230, 230a-n (e.g., ONUs 140, 140a-n), as shown in FIG. 2. Each node 210, 220, 230 may represent a component or a portion of the communication system 100 that may potentially cause a failure or disconnection in the communication system 100. For example, a node may represent a length of optical fiber 110, an OLT 120, an ONU 140, a splitter 160, and/or any other portion of the communication system 100. The network tree 200 may include one or more sub-trees 240, each sub-tree 240 having a sub-tree root node 242 and one or more child nodes 244, 244a-n in communication with the sub-tree root node 242. Moreover, the network tree 200 includes residual trees 250. A residual sub-tree 250 is the network tree 200 minus a given sub-tree 240. Therefore, for every sub-tree 240 in the network tree 200, there is a corresponding residual sub-tree 250, which is the network tree 200 minus the sub-tree 240. The monitoring system 300 may use the network tree 200 as a root cause analysis (RCA) tree for identifying network faults within the communication system 100.

A node 210, 220, 230 experiencing a communication failure is referred to as a "cut" node. The communication failure may be due to a physical cut in communication line (e.g., a cut optical fiber), a power loss, an operation failure or fault, or any other cause of a loss in service. When a node 210, 220, 230 is cut, all child or leaf nodes 230, 244 of the sub-tree 240 having the sub-tree root node 242 equal to the cut node are assumed disconnected.

In the example shown in FIG. 2, the network tree 200 has a certain number of nodes 210, 220, 230, but any number of nodes are possible, as each intermediate node 220 may split communications to any number of additional nodes 220, 230, which may results in many branches of the network tree 200. For PONs 105, the internal state of the network cannot be observed, because the intermediate nodes 220 (network elements) at the split points are not powered and have no means of communicating their state to the monitoring system 300. The only observation that can be made is the state of the OLTs 140. As a result, the monitoring system 300 uses the heart beat signals 142, 142a-n received from the ONUs 140, 140a-n to determines the subscriber status S of each ONU 140. Due to errors in reporting the heart beat signals 142, 142a-n, the observations are often noisy. In some instances, the monitoring system 300 fails to receive some of the heart beat signals 142, 142a-n or some of the heart beat signals 142, 142a-n become corrupted, resulting in a reporting of service degradation when service is actually fine or a reporting that service is fine when there is actually degradation.

Figure 3A:
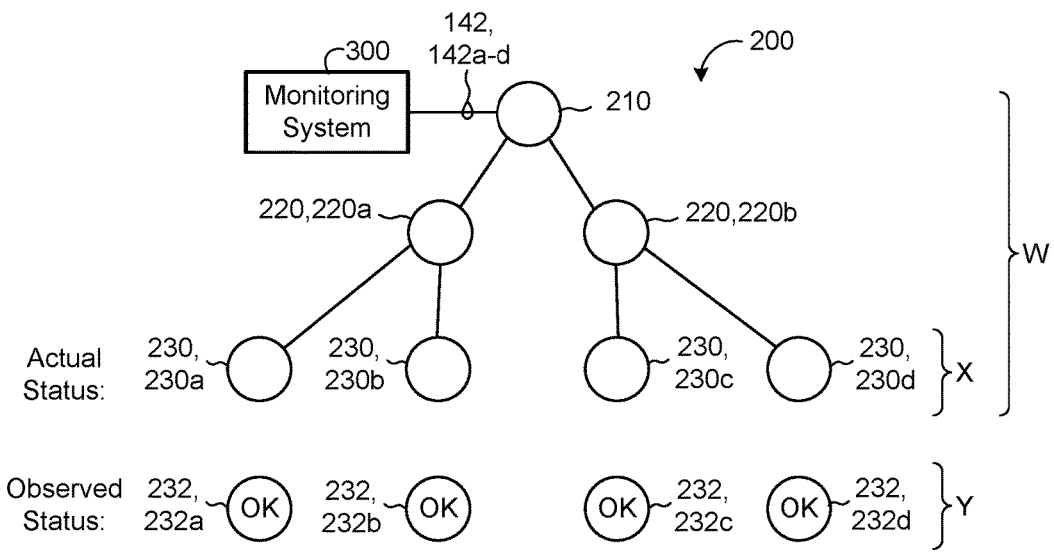
FIG. 3A is a schematic view of an example network tree having no network faults.

FIG. 3A is schematic view of an example network tree 200 have a root note 210, first and second intermediate nodes 220, 220a, 220b, and leaf nodes 230, 230a-d. The first intermediate node 220a has first and second leaf nodes 230a, 230b, and the second intermediate node 220b has third and fourth leaf nodes 230c, 230d. Other permutations are possible, as the example network tree 200 is for illustration purposes. In the example shown, each leaf node 230, 230a-d has connectivity and a corresponding node status 232, 232a-d of OK. In some examples, the node status 232 is OK or Fault (which may be represented as a binary vector of 1 (True) or 0 (False), respectively); while in the additional examples, the node status 232 includes other options indicative of a specific state of the corresponding leaf node 230 and may relate to a level of connectivity or satisfying a threshold connectivity level. The leaf nodes 232, 232a-d may report their corresponding node statuses 232 (e.g., via the heart beats 142) to the root node 210, which may be in communication with the monitoring system 300.

In the examples shown and in the equations below, the nodes 210, 220, 230 have actual statuses (e.g., broken=cut, not broken=not cut) represented by a random variable W (with realizations w), and the leaf nodes 230 have actual statuses represented by a random variable X (with realizations x). The leaf nodes 230 also have observed/reported node statuses 232 represented by a random variable Y (with realizations y). Ideally, the observed/reported node statuses Y, 232 should be the same as the actual leaf node statuses X. In practice, however, one or more of the observed/reported node statuses Y, 232 may differ from the actual leaf node statuses X, due to noise, reporting errors, or other issues in the communication system 100 or the monitoring system 300. Consequently, the reported status Y, 232 of the leaf nodes 230 are modeled by a true-positive-rate (TPR) and a true-negative-rate (TNR).

Figure 3B:
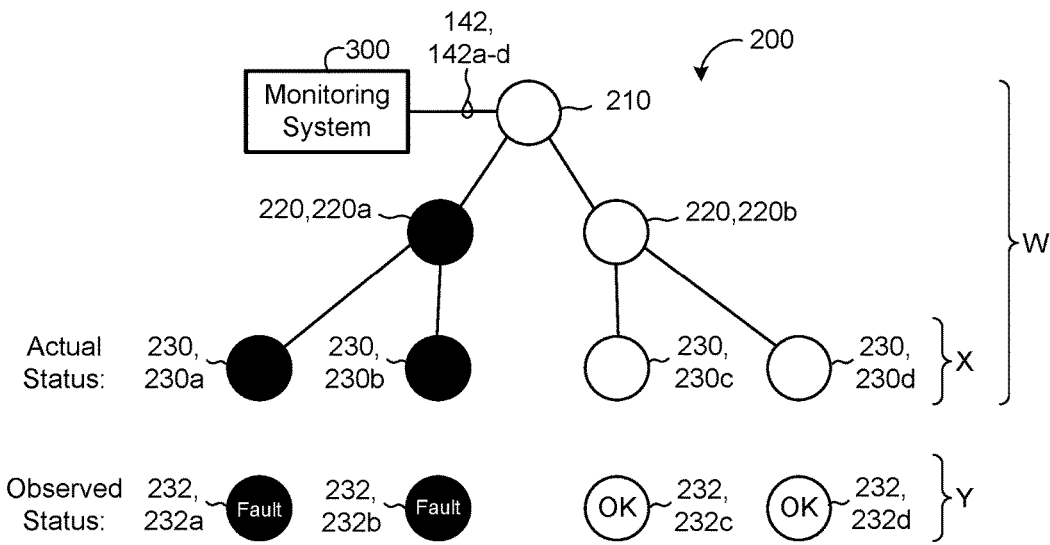
FIG. 3B is a schematic view of an example network tree having properly identified network faults.

FIG. 3B is schematic view of the example network tree 200 of FIG. 3A, but with a "cut" or "communication cut" for the first and second leaf nodes 230a, 230b, caused by a loss of connectivity (e.g., via a fiber cut, component failure, or power loss) to the first intermediate node 220a. Ideally, in such a scenario, the monitoring system 300 identifies the first and second leaf nodes 230a, 230b as having a corresponding node status 232a, 232b of "Fault" (e.g., due to a lack of corresponding heat beat signal 142a, 142b) and the third and fourth leaf nodes 230c, 230d as having a corresponding node status 232c, 232d of "OK" (e.g., due to a receipt of corresponding heat beat signal 142c, 142d). The monitoring system 300 may, however, experience noise that can result in a misassessment of the node status 232, 232a-d, as illustrated by the example shown in FIG. 3C.

Figure 3C:
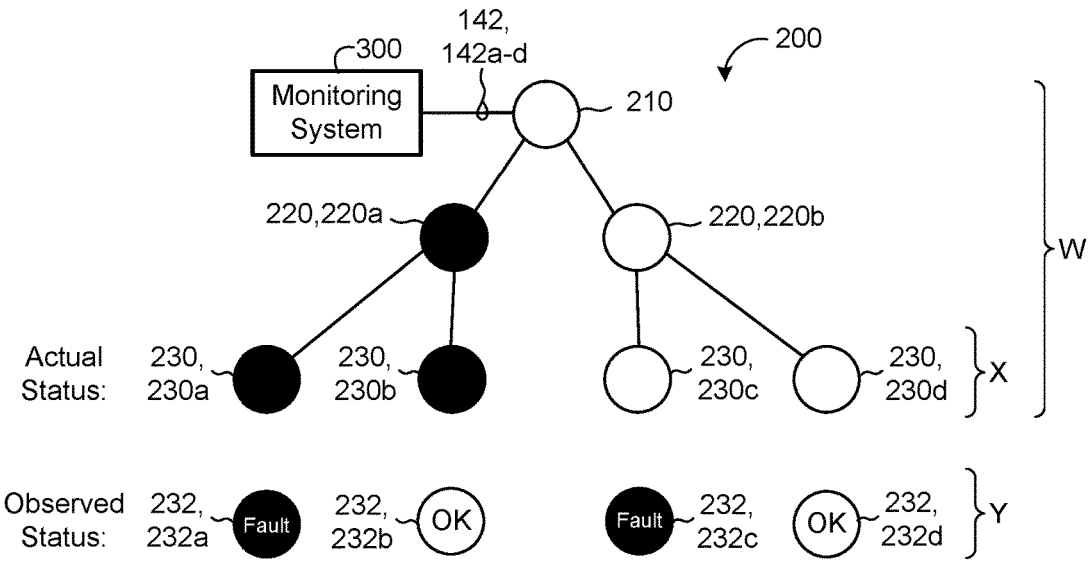
FIGS. 3C and 3D are schematic views of example network trees having misidentified network faults.

FIG. 3C is schematic view of the example network tree 200 of FIG. 3B with erroneous observed/reported node statuses 232, Y. In the example shown, rather than assessing the first and second leaf nodes 230a, 230b as having corresponding node statuses 232a, 232b of "Fault" and the third and fourth leaf nodes 230c, 230d as having corresponding node statuses 232c, 232d of "OK," the monitoring system 300 assesses the first leaf node 230a as having a corresponding node status 232a of "Fault," the second leaf node 230b as having a corresponding node status 232b of "OK," the third leaf node 230c as having a corresponding node status 232c of "Fault," and the fourth leaf node 230d as having a corresponding node status 232d of "OK." In such an example, the observed/reported node statuses 232b, 232c of the second and third leaf nodes 230b, 230c are incorrect and differ from actual node status X of the leaf nodes 230. The incorrect node statuses 232 may be due to a leaf node 230 failing to report its node status 232, a delay in reporting its node status 232, or incorrectly reporting its node status 232. Moreover, other issues, such noise in the network 105 or malfunctioning components of the communication system 100 may cause the erroneous node statuses 232.

The monitoring system 300 is configured to determine which of the thousands of network elements is responsible for service degradation when one or more users 50 experience service degradation. In mathematical terms, the algorithm seeks to compute the probability that a network element is damaged, given the noisy observations of the states of the OLTs 140. In practice this is done using Bayes' rule, where a conditional probability of a network element being damaged given noisy observations of the states of the OLTs 140 to a conditional probability of the observations of the states of the OLTs given an network element being damaged, multiplied by the prior probability of a damage in a network element (computed from historical data or factory information), and normalized by and the likelihood of the observed states of the OLT, namely:

$$p(\text{element damaged} | OLT \text{ States}) = \frac{p(OLT \text{ States} | \text{element damaged}) p(\text{element damaged})}{p(OLT \text{ States})} \quad (1.0)$$

One problem with the naive application of Bayes' rule is that its complexity is linear in the number of network element states (damaged, not-damaged) and the number of OLT states (connected, disconnected), which in turn is exponential in the number of OLTs 140. For a network with thousands of subscribers 150, this becomes computationally intractable. The algorithm discussed below uses a recursive relationship between a probability of a parent network element being damaged and a probability of the network element's children being damaged to efficiently apply Bayes' rule in O(n log n) time, where n is the number of network elements. This allows large networks with tens of thousands of network elements to be analyzed in seconds, allowing execution of highly accurate root cause analysis and relevant repairs to be made before they significantly impact subscriber experience.

A conditional probability is a measure of the probability of an event given that (by assumption, presumption, assertion or evidence) another event has occurred. If the event of interest is A and the event B is known or assumed to have occurred, "the conditional probability of A given B", or "the probability of A under the condition B", is usually written as P(A|B). The joint probability of two events A and B is the measure of the likelihood that both events occur. Therefore, the joint probability of two events A, B can be defined as a product of the conditional probability of one event given the other, times a marginal probability of the latter, that is: P(A, B)=P(A|B) P(B)=P(B|A) P(A). These identities are the basis of Bayes's rule. Moreover, if the events A and B are independent, then P(A|B)=P(A), P(B|A)=P(B), and P(A, B)=P(A) P(B). For example, a joint probability is the probability of two events A and B occurring at the same time. In Bayesian statistics, the posterior probability of a random event or an uncertain proposition is the conditional probability that is assigned after the relevant evidence or background is taken into account.

The following discussion considers a network (e.g., the PON 105) with a tree topology (e.g., the network tree 200) and provides a near linear-time algorithm, executed by the monitoring system 300, to calculate a Bayesian probability of a network fault, such as a "cut" in one of the optical fibers 110, a power cut, or a fault at a node 210, 220, 230, given an observed "connectivity" of the leaves (e.g., the leaf nodes 230, which represent ONTs 140). The monitory system 300 may use the node statuses 232 (also referred to as subscriber statuses) of the leaf nodes 230 in conjunction with a true-positive-rate (TPR) and a true-negative-rate (TNR) to model errors in the reported node statuses 232 (subscriber statuses) and determine posterior probabilities of leaf-cuts or other cuts in the network tree 200.

NOTATIONS

For the purposes of the following discussion regarding a root cause analysis in a network having a tree topology, capital letters denote random variables, e.g., X, Y, while we lower-case letters denote realizations of random variables, e.g., x, y. Square brackets indicate probability distributions. For example, [X] denotes a marginal distribution of X, [X, Y] denotes a joint distribution of X and Y, and [X|Y=y] denotes a conditional distribution of X given Y=y. [X=x] indicates a likelihood of the realization x, [X=x, Y=y] to indicate a likelihood of joint realizations (x, y), and [X=x|Y=y] to indicate a likelihood of the realization x given the realization y.

A semicolon separates a random variable from parameters to indicate a dependency of a probability distribution of a random variable on other parameters. For example, [X; θ], [X=x; θ], [X=x|Y=y; θ].

δ denotes a discrete indicator function of 0 in an finite lattice $\{0,1\}^n$, $n \in \mathbb{N}$. That is, for every $x \in \{0,1\}^n$, we have δ(x)=1 if x=0, δ(x)=0 otherwise.

A tree T=(V, E) with nodes V and edges (leaves) E⊂V×V is trivial if, and only if, |V|=1. That is, T is trivial if it contains only one node.

RCA TREES

Let T=(V, E) denote a tree with n nodes V={$v_1, \ldots, v_n$}, $v_1$ being the root, and n−1 edges (leaves) E⊂V×V. Assume the set V to be ordered (e.g., breadth-first-search (BFS) ordered), such that for every $(v_i, v_j) \in$ E we have i<j.

Definition 1.1 (Node cut). Let T=(V, E) be a tree with n nodes $v_1, \ldots, v_n$. With each node $v_j$, we associate a binary random variable $W_j$ defined by the probability:

$$[W_j=0]=\omega_j, \quad (1.1)$$

where $\omega_j$ denotes a prior probability of a cut in node $v_j$.

Definition 1.2 (Leaf state). Let T=(V, E) be a tree with n nodes $v_1, \ldots, v_n$ and l leaves $\lambda_1, \ldots, \lambda_l$. With each leaf $\lambda_k$, associate a binary random variable $X_k$ defined by:

$$X_k = \prod_{j \in \gamma_k} W_j, \quad (1.2)$$

where $j \in \gamma_k$ if, and only if, $v_j = \lambda_k$ or $v_j$ is an ancestor of $\lambda_j$. In other words, the state of a leaf $X_k$ is equal to 1 if, and only if, all the ancestor nodes of the leaf, including the leaf, have no cuts.

Definition 1.3 (RCA tree). Let T=(V, E) be a tree. Let W be a vector of random cuts with prior probabilities ω and let X be the set of leaf states. A set R=(V, E, W, ω, X) is a "root-cause-analysis" tree, or RCA tree.

Definition 1.4 (Likelihood of the state of the leaves). Let R=(V, E, W, ω, X) be a RCA tree. Denote by L(x, R) a likelihood function of a realization x of X, and by $L_0$(x, R), a likelihood function of a realization x given a cut in the root of R. Namely, $$L(x, R)=[X=x; R], \quad (1.3)$$

$$L_0(X, R)=[X=x|W_1=0;R]. \quad (1.4)$$

Theorem 2.0. Let R=(V, E, W, π, X) be a RCA tree and let x be a realization of X. We have:

$$L_0(x, R)=\delta(x). \quad (2.1)$$

Moreover, if R is not a trivial tree, denoting by $R_i$, the induced sub-tree with root $v_i \in V$, by $x_i$ the projection of x onto the subspace associated with the leaves of $R_i$, and by $\Gamma_1$ the indices of the children of the root $v_1$, we have:

$$L(x, R) = \omega_1 L_0(x, R) + (1 - \omega_1) \prod_{i \in \Gamma_1} L(x_i, R_i). \quad (2.2)$$

Finally, if R is a trivial tree with only one node $v_1$, then:

$$L(x, R)=\omega_1\delta(x)+(1-\omega_1)\delta(1-x). \quad (2.3)$$

Proof. If the tree R has a cut in the root, then no path going from a leaf to the root is without a cut, and therefore X=0. Hence $L_o$(x, R)=δ(x). This proves equation (2.1). Therefore, it follows that:

$$L(x, R)=[X=x; R] \quad (2.4)$$

$$L(x, R)=[X=x|W_1=0; R][W_1=0]+[X=x|W_1=1; R][W_1=1] \quad (2.5)$$

$$L(x, R)=L_0(x, R)\omega_1+[X=x|W_1=1;R](1-\omega_1) \quad (2.6)$$

If R is trivial, then by definition $X=W_0$, and therefore $[X=x|W_0=1; R]=\delta(1-x)$, which proves equation (2.3). If R is not trivial, then denoting by $X_{i_k}$, k=1, ..., c=|$\Gamma_1$| the random state of the leaves belonging to the sub-trees {$R_{i_k}$| k=1, ..., c}, we have:

$$[x = x \mid W_1 = 1; R] = [X_{i_1} = x_{i_1}, \ldots, X_{i_c} = x_{i_c} \mid W_1 = 1] \quad (2.7)$$

$$= [X_{i_1} = x_{i_1} \mid W_1 = 1; R] \ldots [X_{i_c} = x_{i_c} \mid W_1 = 1; R] \quad (2.8)$$

The first equality is a simple identity, since the vector X is equal, up to a permutation, to the vector ($X_{i_1}, \ldots, X_{i_c}$); the second equality expresses the fact that if the root does not have a cut, then the random variables $\{X_{i_1}, \ldots, X_{i_c}\}$ are independent. It is then easy to verify the identities:

$$[X_{i_k}=x_{i_k}|W_1=1; R]=[X_{i_k}=x_{i_k}; R_{i_k}]=L(x_{i_k}, R_{i_k}), k=1, \ldots, c. \quad (2.9)$$

This proves equation (2.2) and completes the proof of the theorem. Using equations (2.1), (2.2), (2.3), recursively compute L(x, R) in linear time.

OBSERVATIONS OF LEAF STATES

Definition 3.1 (Observation of a leaf state). Let R=(V, E, W, ω, X) denote a RCA tree with l leaves. Associate a binary random vector Y with the leaves of R, defined by the binomial likelihood.

$$[Y = y \mid X = x; \mu, v] = \quad (3.1)$$
$$\prod_{j=1}^{l} (1 - v_j + x_j(\mu_j + v_j - 1))^{y_j}(v_j - x_j(\mu_j + v_j - 1))^{1-y_j}$$

An observation of the leaves X of R is $y \in \{0,1\}^l$ with a measurement error defined by a true-positive-rate μ of $\mu \in (0,1]^l$ and a true-negative-rate v of $v \in (0,1]^l$.

Definition 3.2 (Likelihood of the observations of the leaves). Let R=(V, E, W, ω, X) be a RCA tree and let y be an observation of X with the true-positive-rate μ and the true-negative-rate v. Denote by M(x, R, μ, v) a likelihood function of y and by $M_0(y, R, \mu, v)$ a likelihood function of y given a cut in the root of R. Namely, $$M(y, R, \omega, v)=[Y=y; R, \omega, v], \quad (3.2a)$$

$$M_0(y, R, \omega, v)=[Y=y|W_1=0; R, \mu, v]. \quad (3.2b)$$

Lemma 3.3. Let R=(V, E, W, ω, X) be a RCA tree and let y be an observation of X with true-positive-rate μ and true-negative-rate v. Hence:

$$M(y, R, \mu, v) = \sum_{x} [Y = y \mid X = x; \mu, v]L(x, R) \quad (3.3a)$$

$$M_0(u, R, \mu, v) = \sum_{x} [Y = y \mid X = x; \mu, v]L_0(x, R) \quad (3.3b)$$

Proof. From probability theory, it follows that:

$$[Y = y; R, \mu, v] = \sum_{x} [Y = y \mid X = x; \mu, v][X = x; R] \quad (3.3c)$$

$$[Y = y \mid W_1 = 0; R, \mu, v] = \quad (3.3d)$$
$$\sum_{x} [Y = y \mid X = x; \mu, v][X = x; W_1 = 0; R].$$

Equation (3.3a) follows from the definition [X=x; R]=L(x, R), [X=x; $W_1$=0; R]=$L_0$(x, R). The same holds, *mutatis mutandi*, for equation (3.3b).

A brute force calculation of the sums in x has exponential complexity. However, we have the following theorem:

Theorem 3.4. Let R=(V, E, W, ω, X) be a RCA tree and let y be an observation of X with true-positive-rate μ and true-negative-rate v.

$$M_0(y, R, \mu, v) = \prod_{j=1}^{l} (1 - v_j)^{y_j} v_j^{1-y_j} \quad (3.4)$$

Moreover, if R is not a trivial tree, denoting by $R_i$ an induced sub-tree with root $v_i \in V$, by $y_i$, $\mu_i$, $v_i$ a projection of y, u, v onto a subspace associated with the leaves of $R_i$, and by $\Gamma_1$ the indices of the children of the root $v_0$, we have:

$$M(y, R, \mu, v) = w_1 M_0(y, R, \mu, v) + (1 - \omega_1) \prod_{i \in \Gamma_1} M(y_i, R_i, \mu_i, v_i). \quad (3.5)$$

Finally, if R is a trivial tree with only one node $v_0$, then $$M(y, R, \mu, v)=\omega_1(1-v)^y v^{1-y}+(1-\omega_1)\mu^y(1-\mu)^{1-y}. \quad (3.6)$$

Proof. Apply Lemma (3.3) to equations (2.1), (2.2), (2.3). Using equations (2.1), (2.2), (2.3), recursively compute M(y, R) in linear time.

POSTERIOR PROBABILITY OF A CUT

Theorem 4.1. Let R=(V, E, W, ω, X) be a RCA tree and let y be an observation of X with true-positive-rate μ and true-negative-rate v. Let $R_j$ denote an induced sub-tree with root $v_i \in V$ and let $y_i$, $\mu_i$, $v_i$ denote a projection of y, μ, v onto subspaces associated with leaves of the induced sub-tree $R_j$; let $R_j'$ denote a remaining tree, which is the tree R minus the induced sub-tree $R_j$, and let $y_j'$, $\mu_j'$, $v_j'$ denote the projection of y, μ, v onto the subspaces associated with the leaves of the remaining sub-tree $R_j'$. We have:

$$[W_j = 0 \mid Y = y; R, \mu, v] = \omega_j \frac{M_0(y_j, R_j, \mu_j, v_j)M(y_j', R_j', \mu_j', v_j')}{M(y, R, \mu, v)}. \quad (4.1)$$

Proof:

$$[W_j = 0 \mid Y = y; R, \mu, v] = \frac{[Y = y, W_j = 0; R, \mu, v]}{[Y = y; R, \mu, v]} \quad (4.2)$$

and [Y=y; R, μ, v]=M(y, R, μ, v) by definition. Moreover, since Y is equal to a permutation, to $(Y_j, Y_j')$, $$[Y=y, W_j=0; R, \mu, v]=[Y_j=y_j, Y_j'=y_j', W_j=0; R, \mu, v]=[Y_j=y_j|Y_j'=y_j', W_j=0; R, \mu, v][Y_j'=y_j', W_j=0; R, \mu, v]. \quad (4.3)$$

If $W_j$=0, then regardless of the value of $Y_j'$, the leaves of the sub-tree $R_j$ are all in a zero state, and therefore:

$$[Y_j=y_j|Y_j'=y_j', W_j=0; R, \mu, v]=[Y_j=y_j|W_j=0; R_j, \mu_j, v_j]=M_0(y, R_j, \mu_j, v_j). \quad (4.4)$$

On the other hand, the state of the leaves of the sub-tree $R_j'$; is independent from the state of the node $W_j$ (this node belongs to the induced sub-tree $R_j$ and is disconnected from the remaining sub-tree $R_j'$), therefore:

$$[Y_j'=y_j', W_j=0; R, \mu, v]=[Y_j'=y_j'; R_j', \mu_j', v_j'][W_j=0]=M(y_j', R_j', \mu_j', v_j')\omega_j, \quad (4.5)$$

completing the proof of Theorem 4.1.

Figure 3D:
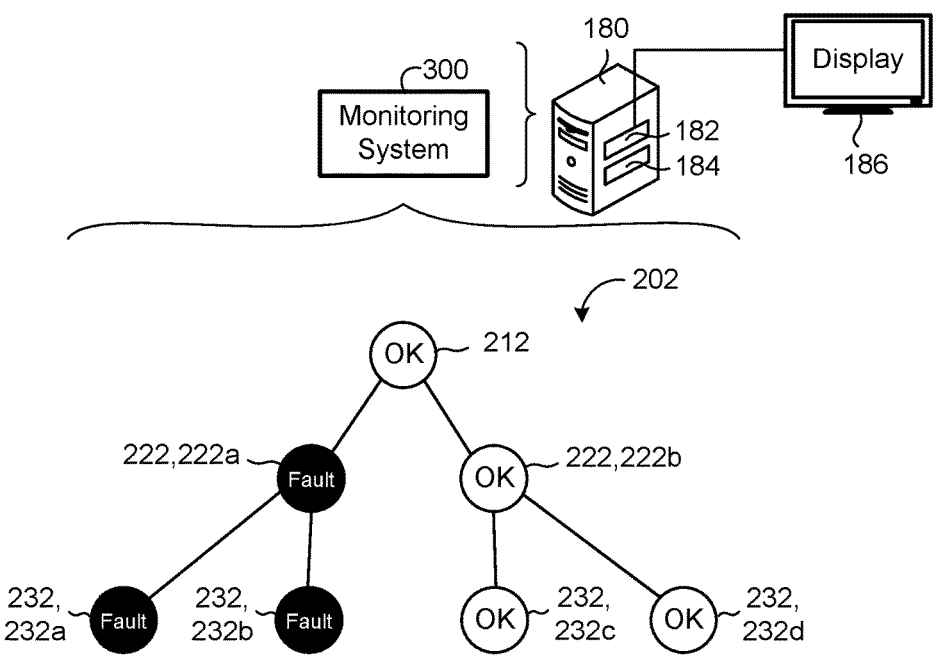

The monitoring system 300 uses the subscriber statuses 232, 232a-n of the leaf nodes 230 to determine network node status topology 202, an example of which is shown in FIG. 3D. In some examples, the monitoring system 300 executes the statistical analysis described herein to indicate a node status 212, 222, 232 of nodes of the network tree 200 based on the determined Bayesian posterior probabilities. In the example shown, the network tree 200 shown in FIG. 3B has a network node status topology 202 as shown in FIG. 3D. The root node 210 has a root node status 212, the intermediate nodes 220, 220a, 220b have corresponding intermediate node statuses 222, 222a, 222b, the leaf nodes 230, 230a-d have corresponding leaf node statuses 232, 232a-d. In some implementations, the monitoring system 300 determines a likelihood of the observed leaf state in every subtree $R_j$ using a linear time algorithm based on equations (3.4), (3.5), and (3.6).

Figure 4:
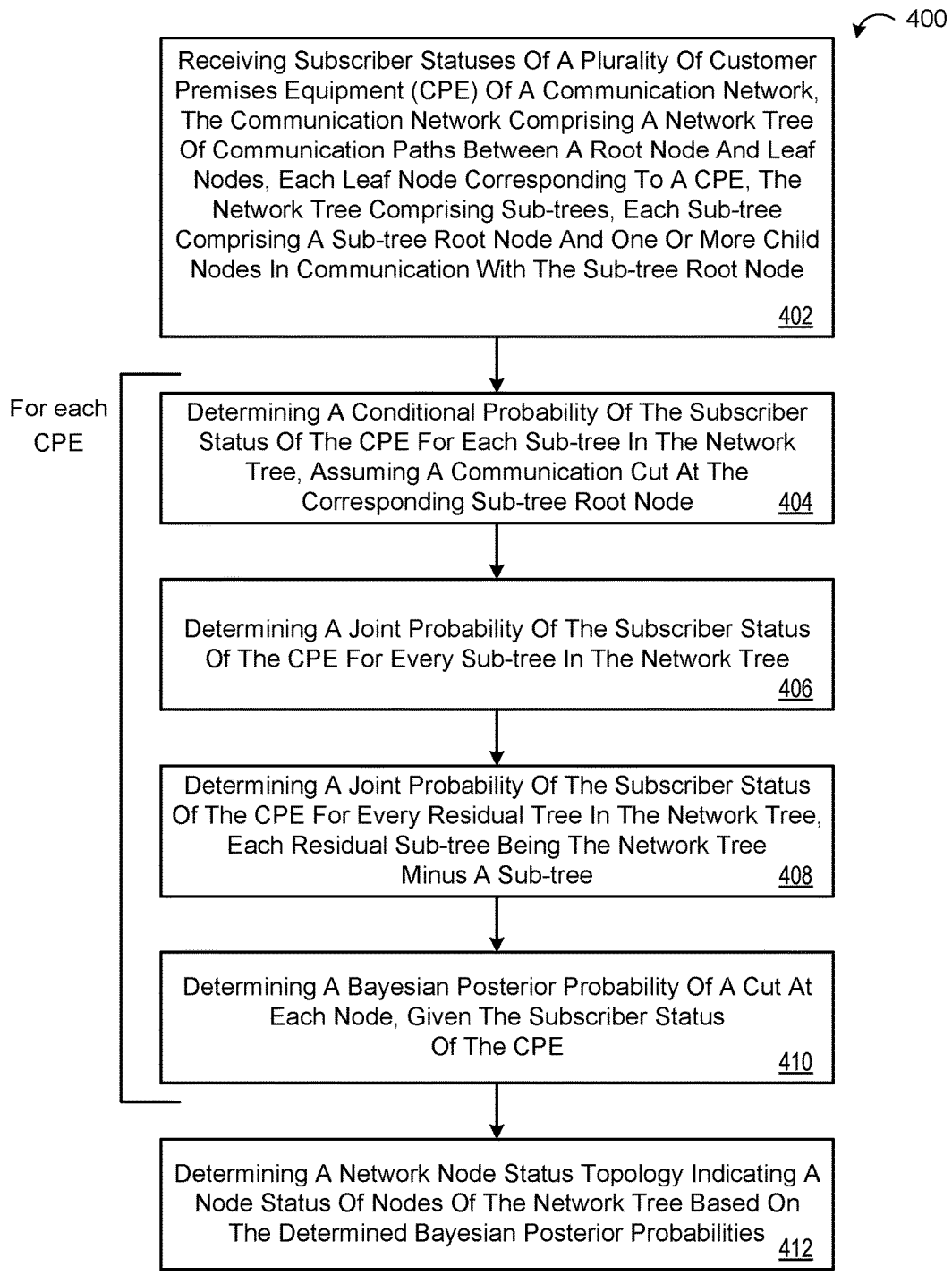
FIG. 4 is a schematic view of an example arrangement of operations for a method of identifying network faults.

FIG. 4 is a schematic view of an example arrangement of operations for a method 400 of identifying network faults. The method 400 includes, at block 402, receiving, at data processing hardware 182, subscriber statuses 232 of a plurality of ONTs 140 (e.g., CPEs) of a communication network (e.g., PON 105). The communication network 105 includes a network tree 200 of communication paths 110 between a root node 210 and leaf nodes 230, 230a-n. Each leaf node 230 corresponds to an ONT 140. The network tree 200 includes sub-trees 240, where each sub-tree 240 includes a sub-tree root node 242 and one or more child nodes 244 in communication with the sub-tree root node 242. For each ONT 140 (CPE), the method includes: (i) at block 404, determining, by the data processing hardware 182, a conditional probability of the subscriber status 232 of the ONT 140 for each sub-tree 240 in the network tree 200, assuming a communication cut at the corresponding sub-tree root node 242; (ii) at block 406, determining, by the data processing hardware 182, a joint probability of the subscriber status 232 of the ONT 140 for every sub-tree 240 in the network tree 200; (iii) at block 408, determining, by the data processing hardware 182, a joint probability of the subscriber status 232 of the ONT 140 for every residual tree 250 in the network tree 200, each residual sub-tree 250 being the network tree 200 minus a sub-tree 240; and (iv) at block 4010, determining, by the data processing hardware 182, a Bayesian posterior probability of a cut at each leaf node 230, given the subscriber status 232 of the ONT 140. At block 412, the method further includes determining, by the data processing hardware 182, a network node status topology 202 indicating node statuses 212, 222, 232 of nodes 210, 220, 230 of the network tree 200 based on the determined Bayesian posterior probabilities.

In some implementations, the method 400 includes receiving, at the data processing hardware 182, a heartbeat signal 142 from each ONT 140 and determining, by the data processing hardware 182, the subscriber status 232 of each ONT 140 (i.e., the leaf node status 232 of the leaf node 230 in the network tree 200 representing the ONT 140) based on the corresponding heartbeat signal 142 of the ONT 140. In some examples, the subscriber status 232 includes an operation state or a network state of the corresponding ONT 140.

The monitoring system 300 may implement the steps of: (i) determining the conditional probability of the subscriber status 232 of the ONT 140 for each sub-tree 240 in the network tree 200, assuming a communication cut at the corresponding sub-tree root node 242; and (ii) determining the joint probability of the subscriber status 232 of the ONT 140 for every sub-tree 240 in the network tree 200 using the Algorithm 1, as described below.

ALGORITHM 1

Let $R=(V, E, W, \omega, X)$ be a RCA tree with l leaves and let $y \in \{0,1\}^l$ be an observation of the leaf state X with true-positive-rate $\mu \in (0,1]^l$ and true-negative-rate $v \in (0,1]^l$. Let $R_j$ denote the induced subtree with root $v_j \in V$ and let $y_j$, $\mu_j$, $v_j$ denote the projection of $y$, $\mu$, $v$ onto the subspaces associated with the leaves of R. Assume the nodes to be in BFS order and let $\Gamma_j$ denote the set of node indices of the children of $v_j$.

The method 400 includes receiving, at the data processing hardware 182, the following inputs:

The vector of prior probabilities, $\omega \in [0,1]^n$;
The integer sets of child indices, $\Gamma_j \subset \{1, \ldots, n\}$, $j=1, \ldots, n$;
The binary vector of observed leaf state (e.g., fiber cut, power cut, node fault, etc.), $y \in \{0,1\}^l$;
The true-positive-rate vector associated with the observed leaf state, $\mu \in (0,1]^l$; and
The true-negative-rate vector associated with the observed leaf state, $v \in (0,1]^l$.

Based on the received inputs, the method 400 includes outputting, from the data processing hardware 182, the following outputs:

The vector $\lambda_0 \in [0, 1]^n$ containing the conditional likelihoods of the observed leaf state of every subtree 240, $R_j$, $j=1, \ldots, n$, given a cut in the root 242 of the subtree 240. Namely, $\lambda_{0,j}=M_0(y_j, R_j, \mu_j, v_j)$.
The vector $\lambda \in [0, 1]^n$ containing the joint likelihoods of the observed leaf state of every subtree 240, $R_j$, $J=1, \ldots, n$. Namely, $\lambda_j=M(y_j, R_j, \mu_j, v_j)$.

The method 400 includes executing, by the data processing hardware 182, the following:

For $j=n, \ldots 1$
  If $v_j$ is a leaf with leaf index k $$\lambda_{0,j}:=(1-v_k)^{y_k} v_k^{1-y_k}$$

$$\lambda_j:=\omega_j \lambda_{0,j}+(1-\omega_j)\mu_k^{y_k}(1-\mu_k)^{1-y_k}$$

Else $$\lambda_{0,j}:=\Pi_{i \in \Gamma_j}\lambda_{0,i}$$

$$\lambda_j:=\omega_j \lambda_{0,j}+(1-\omega_j)\Pi_{i \in \Gamma_j}\lambda_i$$

End if
End for
Return $\lambda_0$, $\lambda$

Since the nodes 210, 220, 230 are in BFS order, the likelihood functions on the right-hand-side of the equations in the else block have already been computed by the time that they are used to calculate the left-hand-side of the equations. Moreover, since the sum of number of children of every node is equal to the number of nodes minus the root, that is $\Sigma_{j=1}^n |\Gamma_j|=n-1$, and the number of leaves l is at most equal to the number of nodes, then the total complexity of the algorithm is $$O(l) + \sum_{j=1}^{n} O(|\Gamma_j|) = O(n) \qquad (5.1)$$

Given the likelihood vectors $\lambda_0$, $\lambda$ computed in Algorithm 1, Algorithm 1 has a complexity of O(nh), where n is the number of nodes and h is the height of the tree, to calculate the likelihood of the observed leave state in every residual tree $R_j'$, namely:

The monitoring system 300 may implement the step of (iii) determining the joint probability of the subscriber status 232 of the ONT 140 for every residual tree 250 in the network tree 200 using Algorithm 2, as described below.

ALGORITHM 2

Let R=(V, E W, ω, X) be a RCA tree with l leaves and let y∈{0,1}$^l$ be an observation of the leaf state X with true-positive-rate μ∈(0,1]$^l$ and true-negative-rate v∈(0,1]$^l$. Let $R_j'$ denote the jth residual tree defined as the tree R minus the induced subtree $R_j$. Let $y_j'$, $\mu_j'$, $v_j'$ denote the projection of y, μ, v onto the subspaces associated with the leaves $R_j'$. Let $p_j$ be the parent index of node $v_j$, $p_j$=0 if j is the root, and let $\Gamma_j$ denote the set of node indices of the children of $v_j$.

The method 400 includes receiving, at the data processing hardware 182, the following inputs:

The vector of prior probabilities, co E [0,1]$^n$;
The parent indices, $p_j \in \{0, \ldots, n-1\}$, j=1, ... n;
The integer sets of child indices, $\Gamma_j \subset \{1, \ldots, n\}$, j=1, ..., n;
The vector $\lambda_0 \in [0, 1]^n$ containing the conditional likelihoods of the observed leaf state of every subtree $R_j$, j=1, ..., n, given a cut in the root of the subtree, namely $\lambda_{0,j}=M_0(y_j, R_j, \mu_j, v_j)$; and
The vector $\lambda_0 \in [0, 1]^n$ containing the joint likelihoods of the observed leaf state of every subtree $R_j$, j=1, ..., n. Namely, $\lambda_j=M(y_j, R_j, \mu_j, v_j)$.

Based on the received inputs, the method 400 includes outputting, from the data processing hardware 182, the following outputs:

The vector $\lambda_0 \in [0, 1]^n$ containing the joint likelihoods of the observed leaf state of every residual tree $R_j$, j=1, ..., n. Namely, $\lambda_j'=M(y_j', R_j', \mu_j', v_j')$.

The method 400 includes executing, by the data processing hardware 182, the following:

```
For j = n, ... 1
    λ'₀,ⱼ := 1, λ'ⱼ := 1, k = j
    While pₖ ≠ 0
```

$$\lambda'_{0,j} := \lambda'_{0,j} \prod_{\substack{i \in \Gamma_{p_k} \\ i \neq k}} \lambda_{0,i}$$

$$\lambda'_j = \omega_{p_k} \lambda'_{0,j} + (1 - \omega_{p_k})\lambda'_j \prod_{\substack{i \in \Gamma_{p_k} \\ i \neq k}} \lambda_i$$

```
        k := pₖ
    End while
End for
Return λ'.
```

Since the number of ancestors of a node is at most equal to a height h of the tree R, 200, then this algorithm has complexity O(nh). For a balanced network (e.g., a practical case), h=O(log n), yielding O(nh)=O(n log n).

Finally, given the likelihood vectors $\lambda_0, \lambda, \lambda'$ calculated by Algorithm 1 and Algorithm 2, the calculation of the Bayesian posterior probability of a cut in node $v_j$ given the observed state of the leaves y is given by equation (4.2), yielding Algorithm 3.

The monitoring system 300 may implement the step of (iv) determining the Bayesian posterior probability of a cut at each leaf node 230, given the subscriber status 232 of the ONT 140, using Algorithm 3, as described below.

ALGORITHM 3

Let R=(V, E W, ω, X) be a RCA tree with l leaves and let y∈{0,1}$^l$ be an observation of the leaf state X with true-positive-rate μ∈(0,1]$^l$ and true-negative-rate v∈(0,1]$^l$. Let $R_j$ denote the induced subtree with root $v_j \in V$ and let $y_j$, $\mu_j$, $v_j$ denote the projection of y, μ, v onto the subspaces associated with the leaves of $R_j$; let $R_j'$ denote the tree R minus the induced subtree $R_j$, and let $y_j'$, $\mu_j'$, $v_j'$ denote the projection of y, μ, v onto the subspaces associated with the leaves of $R_j'$.

The method 400 includes receiving, at the data processing hardware 182, the following inputs:

The vector of prior probabilities, ω∈[0,1]$^n$;
The vector $\lambda_0 \in [0, 1]^n$ containing the conditional likelihoods of the observed leaf state of every subtree $R_j$, j=1, ..., n, given a cut in the root of the subtrees, namely $\lambda_{0,j}=M_0(y_j, R_j, \mu_j, v_j)$;
The vector $\lambda \in [0, 1]^n$ containing the joint likelihoods of the observed leaf state of every subtree $R_j$, j=1, ..., n, namely, $\lambda_j=M(y_j, R_j, \mu_j, v_j)$; and
The vector $\lambda' \in [0, 1]^n$ containing the joint likelihoods of the observed leaf state of every residual tree $R_j'$, j=1, ..., n. Namely, $\lambda_j'=M(y_j', R_j', \mu_j', v_j')$.

Based on the received inputs, the method 400 includes outputting, from the data processing hardware 182, the following outputs:

The vector it π∈[0, 1]$^n$ containing the posterior probabilities of node cuts for every node in the tree R, given the observed leaf state. Namely, $\pi_j=[W_j=0|Y=y; R, \mu, v]$.

The method 400 includes executing, by the data processing hardware 182, the following:

```
For j = n, ... 1
```

$$\pi_j := \omega_j \frac{\lambda_{0,j} \lambda'_j}{\lambda_1}$$

```
End for
Return π
```

Assuming balanced RCA trees, the combined complexity of the algorithms needed to calculate the vector π is O(n log n). To achieve maximal numerical accuracy, the computation of the probabilities in all algorithms should be performed in log-scale.

Data processing hardware 182 may execute instructions stored in and accessed from memory hardware 184 that cause the data processing hardware to perform operations that implement Algorithms 1, 2, and 3. In some implementations, the operations include the following functions, where the valid range of the real variables is assumed to be [−INFINITY, INFINITY], boundary included. The logarithm of 0 is assumed to return −INFINITY, and the exponential of −INFINITY is assumed to return 0. The pound sign denotes comments, and the += sign denotes the "addition assignment" operator.

```
# Example Utility Function to calculate log(exp(a) + exp(b)) with
# high precision.
f(a, b)
```

-continued

```
    if a < b swap(a, b)
    # now a >= b
    t = exp(b - a) # since a >= b, then 0 <= t <= 1
    return a + log1p(t)
# The function log1p(t) is a standard library function
# calculating log(1 + t) with high precision for small t.
# Example implementation of Algorithm 1 with calculations
# performed in log-scale to maximize numerical accuracy and
# minimize numerical underflow:
# The example efficiently computes the log-likelihood of the observed
# leaf state for every subtree using a recursive formula. The nodes are
# assumed to be in BFS order.
# Input:
leaf           # a map from the node indices to the leaf indices.
omega          # vector of prior probabilities.
Gamma          # vector containing the child indices of each node.
y # binary vector containing the observed leaf state.
mu             # the true-positive-rate associated with the leaf state.
nu             # the true-negative-rate associated with the leaf state.
# Output:
log_lambda0    # vector containing the conditional log-likelihood of the
               # observed leaf state for every subtree assuming a cut
               # in the root of the subtree
log_lambda     # vector containing the log-likelihood of the observed
               # observed leaf state for every subtree
for j = n, ..., 1
    if Gamma[j] is empty # the node is a leaf
        k = leaf[j]
        log_lambda0[j] = y == 1 ? log(1 - nu[k]) : log(nu[k])
        log_lambda1 = y == 1 ? log(mu[k]) : log(1 - mu[k])
    else
        log_lambda0[j] = 0
        log_lambda1 = 0
        for i in Gamma[j]
            log_lambda0[j] += log_lambda0[i]
            log_lambda1 += log_lambda[i]
        end for
    end if
    log_lambda[j] = f(log(omega[j]) + log_lambda0[j],
                     log(1 - omega[j]) + log_lambda1)
end for
return log_lambda0, log_lambda
# Example implementation of Algorithm 2 with calculations
# performed in log-scale to maximize numerical accuracy and
# minimize numerical underflow:
# The example efficiently computes the log-likelihood of the observed
# leaf state for every residual tree using dynamic programming.
# input:
omega          # vector of prior probabilities.
p # vector containing the parent index of each node; contains 0 if
# the node is the root.
Gamma          # vector containing the child indices of each node.
log_lambda0    # vector containing the conditional log-likelihood of the
               # observed leaf state for every subtree assuming a cut
               # in the root of the subtree
log_lambda     # vector containing the log-likelihood of the observed
               # observed leaf state for every subtree
# output:
log_lambda_prime    # vector containing the log-likelihood of the
                    observed
                    # observed leaf state for every residual tree
for j = 1, ..., n
    log_lambda_prime0 = 0
    log_lambda_prime[j] = 0
    k = j
    while p[k] != 0
        log_lambda_prime1 = log_lambda_prime[j]
```

```
        for i in Gamma[p[k]]
            if i != k
                log_lambda_prime0 += log_lambda[i]
                log_lambda_prime1 += log_lambda[i]
            end if
        end for
        log_lambda_prime[j] = f(log(omega[p[k]]) + log_lambda_prime0,
                                log(1 - omega[p[k]]) +
                                log_lambda_prime1)
        k = p[k]
    end while
end for
return log_lambda_prime
# Example implementation of ALGORITHM 3
# The example computes the posterior probability of node cuts given
# the observed leaf state for every node in the tree.
# input:
omega          # vector of prior probabilities.
p # vector containing the parent index of each node; contains 0 if
# the node is the root.
Gamma          # vector containing the child indices of each node.
y # binary vector containing the observed leaf state.
log_lambda0    # vector containing the conditional log-likelihood of the
               # observed leaf state for every subtree assuming a cut
               # in the root of the subtree
log_lambda     # vector containing the log-likelihood of the observed
               # observed leaf state for every subtree
log_lambda_prime    # vector containing the log-likelihood of the
                    observed
                    # observed leaf state for every residual tree
# output:
pi   # vector containing the posterior probabilities of node cuts,
# given the observed leaf state, for every node in the tree.
for j = 1, ..., n
    pi[j] = omega[j] * exp(log_lambda0[j] + log_lambda_prime[j] -
                           log_lambda[1])
end for
return pi
```

In some implementations, the method 400 includes determining, by the data processing hardware 182, a graphical representation of the network node status topology 205 and displaying, by the data processing hardware 182, the graphical representation of the network node status topology 205 on a screen 186 in communication with the data processing hardware 182. A user 150 or service person may use the graphical representation of the network node status topology 205 to discern issues with the communication system 100 (e.g., of the PON 105). In some examples, the method 400 includes issuing, by the data processing hardware 182, a network correction command based the determined network node status topology 205. The network correction command is associated with at least one node 210, 20, 230 of the network tree 200 having a fault status.

For PONs 105, the intermediate nodes 220 of the network tree 200 correspond to passive optical devices (e.g., PON components incapable of reporting back an operational status). To remedy this problem, the method 400 allows identification of network faults (e.g., fiber cuts) in the nodes 210, 220, 230 of the network tree 200 via a statistical analysis of the communication network 105 based on the subscriber statuses 232.

In some examples, determining the conditional probability of the subscriber status 232 of the CPE 140 for each sub-tree in the network tree 200 or determining the joint probability of the subscriber status 232 of the CPE 140 for every sub-tree in the network tree 200 includes receiving a first input set. The first input set may include a node map defining pathways between node indices and leaf indices, wherein the nodes 210, 220, 230 are assumed to be breadth-first-search ordered, a first vector defining an observed leaf state, a second vector defining prior probabilities, and a third vector defining child indices of each node. The first input set may also include a true-positive-rate μ associated with the observed leaf state and a true-negative-rate ν associated with the observed leaf state. The method 400 may also include determining, based on the first input set, a fourth vector defining a conditional log-likelihood of the observed leaf state for every sub-tree assuming a cut in the sub-tree node of the corresponding sub-tree and a fifth vector defining a log-likelihood of the observed leaf state for every sub-tree in the network tree 200.

In some implementations, the method 400 includes determining the joint probability of the subscriber status 232 of the CPE 140 for every residual tree in the network tree 200 includes calculating receiving a second input set. The second input set may include the second vector, the third vector, the fourth vector, the fifth vector, and a sixth vector defining a parent index of each node 210, 220, 230. The method 400 may also include determining, based on the second input set, a seventh vector defining the log-likelihood of the observed leaf state for every residual tree in the network tree 200.

Determining the Bayesian posterior probability of the communication cut at each leaf node 210, 220, 230 may include calculating receiving a third input set. The third input set may include the first vector, the second vector, the third vector, the fourth vector, the fifth vector, the sixth vector, and the seventh vector. The method 400 may also include determining, based on the third input set, an eighth vector defining Bayesian posterior probabilities of node cuts, given the observed leaf state, for every node 210, 220, 230 in the network tree 200.

Figure 5:
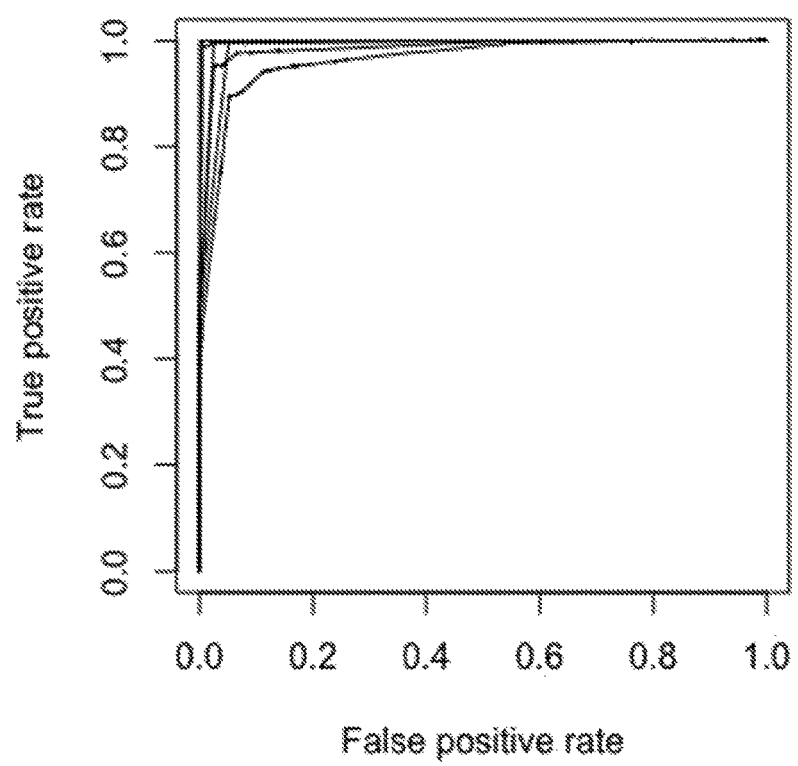
FIG. 5 is a graph illustrating the predictive power of a binary classifier using a receiving operator characteristic curve.

Referring to FIG. 5, in some implementations, the method 400 is considered an RCA predictor or as a binary classifier that predicts the state of a binary variable, e.g., fiber cut or no fiber cut. The predictive power of a binary classifier can be evaluated using the Receiving Operator Characteristic curve, or ROC curve. The ROC curve plots the True Positive Rate (TPR) of the predictions versus the False Positive Rate (FPR) of the predictions. The area under the ROC curve, or AUC, is a scalar value between 0.5 and 1, where 0.5 to 0.6 indicates random guessing to poor predictive power, 0.6 to 0.7 indicates poor to fair predictive power, 0.7 to 0.8 indicates fair to good predictive power, 0.8 to 0.9 indicates good to excellent predictive power, and 0.9 to 1.0 indicates excellent to perfect predictive power.

The following example simulation considers a network 105 having a corresponding network tree 200 with 32K intermediate nodes 220 and 32K leaf nodes. The network tree 200, for simulation purposes, has a binary tree topology (i.e., a tree topology where each non-leaf node had two children). The simulation simulates cuts in service with a prior probability of 0.1%, yielding an average of 64 cuts per simulation. 100 simulations are run for 7 different levels of noise in the reported node statuses 232 of the leaf nodes 230. For each simulation, the posterior probabilities of the service cuts given the reported statuses 232 of the of the leaf nodes 230 are calculated using the aforementioned method 400. FIG. 5 illustrates a graph showing an ROC curve 500 for the simulations. Table 1 provides the area under the ROC curve 500 associated with the different simulations. Each row represents 100 simulations and is associated with a different level of noise in the reported node statuses 232 (subscriber statuses) of the leaf nodes 230. The noise is modeled using the TPR and the TNR of the reported node statuses 232 relative to the actual node statuses 232 of the leaf nodes 230.

TABLE 1

| TPR of Reported Subscriber Status | TNR of Reported Subscriber Status | Area under ROC Curve |
| --- | --- | --- |
| 1 | 1 | 1 |
| 0.99 | 1 | 0.999 |
| 0.99 | 0.99 | 0.997 |
| 0.95 | 1 | 0.993 |
| 0.95 | 0.95 | 0.985 |
| 0.90 | 1 | 0.986 |
| 0.90 | 0.90 | 0.964 |

The ROC curve 500 of FIG. 5 and the data in Table 1 illustrate that the method 400, an RCA Bayesian predictor, behaves as an excellent classifier on simulated data, even with a measurement error of 10%. Moreover, Table 2 illustrates the efficiencies achieved by the method 400.

TABLE 2

| Algorithm | Complexity | Running Time |
| --- | --- | --- |
| Brute force algorithm | $O(2^n)$<br>n = Number of nodes | Billions of years to analyze a network with 100 nodes |
| Recursive algorithm | $O(n^2)$<br>n = Number of nodes | Days to analyze a network with one million nodes |
| Dynamic programming optimization of recursive algorithm | $O(nh)$<br>n = Number of nodes<br>h = Height of Network Tree | Less than a second to analyze a balanced network with one million nodes |

Figure 6:
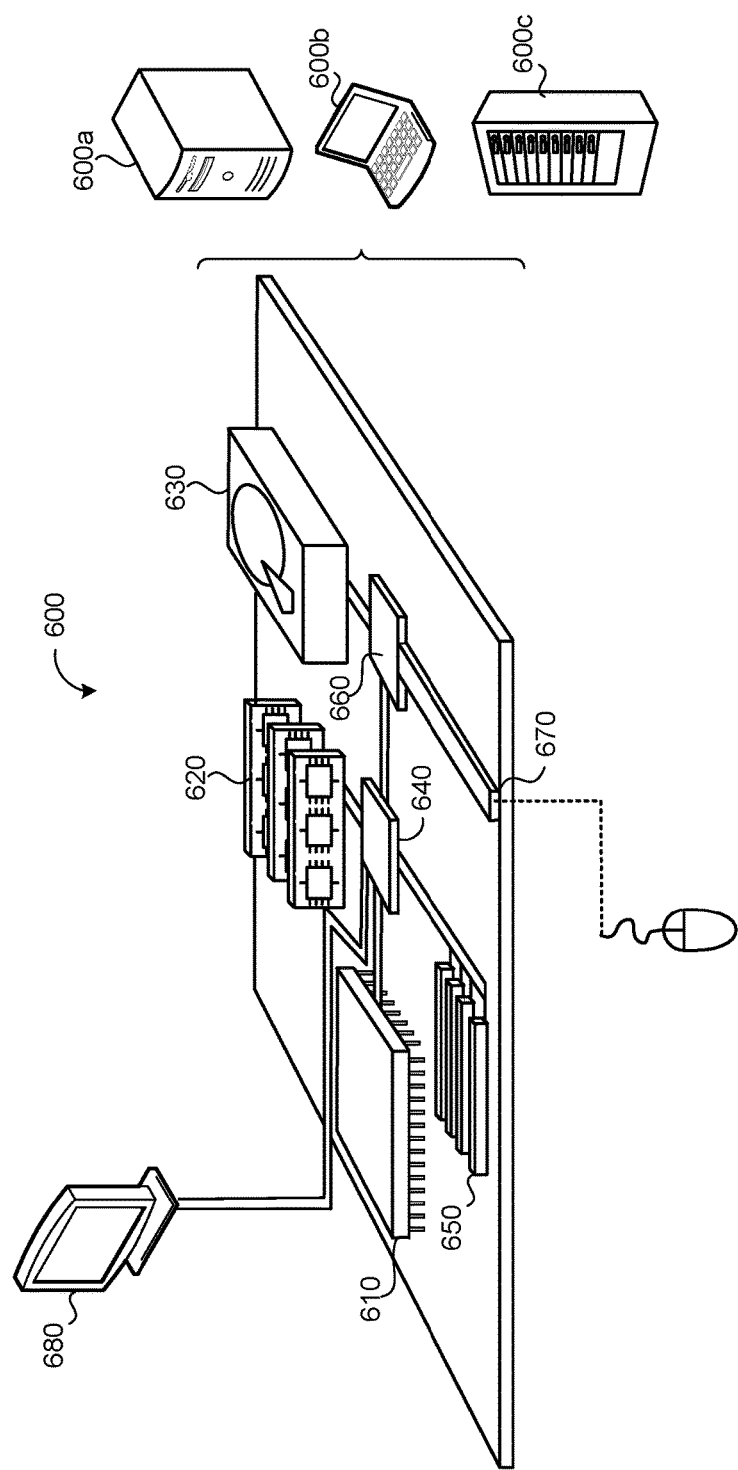
FIG. 6 is schematic view of an example computing device that may be used to implement the systems and methods described in this document.

FIG. 6 is schematic view of an example computing device 600 that may be used to implement the systems and methods described in this document. The computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 600 includes a processor 610, memory 620, a storage device 630, a high-speed interface/controller 640 connecting to the memory 620 and high-speed expansion ports 650, and a low speed interface/controller 660 connecting to low speed bus 670 and storage device 630. Each of the components 610, 620, 630, 640, 650, and 660, are interconnected using various busses, and may be mounted on a common motherboard or in other manners as appropriate. The processor 610 can process instructions for execution within the computing device 600, including instructions stored in the memory 620 or on the storage device 630 to display graphical information for a graphical user interface (GUI) on an external input/output device, such as display 680 coupled to high speed interface 640. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 620 stores information non-transitorily within the computing device 600. The memory 620 may be a computer-readable medium, a volatile memory unit(s), or non-volatile memory unit(s). The non-transitory memory 620 may be physical devices used to store programs (e.g., sequences of instructions) or data (e.g., program state information) on a temporary or permanent basis for use by the computing device 600. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 630 is capable of providing mass storage for the computing device 600. In some implementations, the storage device 630 is a computer-readable medium. In various different implementations, the storage device 630 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 620, the storage device 630, or memory on processor 610.

The high speed controller 640 manages bandwidth-intensive operations for the computing device 600, while the low speed controller 660 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 650, which may accept various expansion cards (not shown). In some implementations, the low-speed controller 660 is coupled to the storage device 630 and low-speed expansion port 670. The low-speed expansion port 670, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 600a or multiple times in a group of such servers 600a, as a laptop computer 600b, or as part of a rack server system 600c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A method comprising:
receiving, at data processing hardware, subscriber statuses of a plurality of customer premises equipment (CPE) of a communication network, the communication network comprising a network tree of communication paths between a root node and leaf nodes, each leaf node corresponding to a CPE, the network tree comprising sub-trees, each sub-tree comprising a sub-tree root node and one or more child nodes in communication with the sub-tree root node;

for each CPE:
determining, by the data processing hardware, a conditional probability of the subscriber status of the CPE for each sub-tree in the network tree, assuming a communication cut at the corresponding sub-tree root node;
determining, by the data processing hardware, a joint probability of the subscriber status of the CPE for every sub-tree in the network tree;
determining, by the data processing hardware, a joint probability of the subscriber status of the CPE for every residual tree in the network tree, each residual sub-tree being the network tree minus a sub-tree; and
determining, by the data processing hardware, a Bayesian posterior probability of the communication cut at each node, given the subscriber status of the CPE; and determining, by the data processing hardware, a network node status topology indicating node statuses of nodes of the network tree based on the determined Bayesian posterior probabilities.

2. The method of claim 1, further comprising:
receiving, at the data processing hardware, a heartbeat signal from each CPE; and
determining, by the data processing hardware, the subscriber status of each CPE based on the corresponding heartbeat signal of the CPE.

3. The method of claim 2, wherein the subscriber status comprises an operation state or a network state of the corresponding CPE.

4. The method of claim 1, further comprising:
determining, by the data processing hardware, a graphical representation of the network node status topology; and
displaying, by the data processing hardware, the graphical representation of the network node status topology on a screen in communication with the data processing hardware.

5. The method of claim 1, further comprising issuing, by the data processing hardware, a network correction command based the determined network node status topology, the network correction command associated with at least one node of the network tree having a fault status.

6. The method of claim 1, wherein the communication network comprises a passive optical network and the customer premise equipment comprises optical line terminals.

7. The method of claim 1, wherein at least one node of the network tree corresponds to a passive optical device.

8. The method of claim 1, wherein determining the conditional probability of the subscriber status of the CPE for each sub-tree in the network tree or determining the joint probability of the subscriber status of the CPE for every sub-tree in the network tree comprises:
receiving a first input set comprising:
a node map defining pathways between node indices and leaf indices, wherein the nodes are assumed to be breadth-first-search ordered;
a first vector defining an observed leaf state;
a second vector defining prior probabilities;
a third vector defining child indices of each node;
a true-positive-rate associated with the observed leaf state; and
a true-negative-rate associated with the observed leaf state; and
determining based on the first input set:
a fourth vector defining a conditional log-likelihood of the observed leaf state for every sub-tree assuming a communication cut in the sub-tree root node of the corresponding sub-tree; and
a fifth vector defining a log-likelihood of the observed leaf state for every sub-tree in the network tree.

9. The method of claim 8, wherein determining the joint probability of the subscriber status of the CPE for every residual tree in the network tree comprises calculating:
receiving a second input set comprising:
the second vector;
the third vector
the fourth vector;
the fifth vector; and
a sixth vector defining a parent index of each node; and
determining based on the second input set a seventh vector defining the log-likelihood of the observed leaf state for every residual tree in the network tree.

10. The method of claim 9, wherein determining the Bayesian posterior probability of the communication cut at each leaf node comprises calculating:
receiving a third input set comprising:
the first vector;
the second vector;
the third vector
the fourth vector;
the fifth vector;
the sixth vector; and
the seventh vector; and
determining based on the third input set an eighth vector defining Bayesian posterior probabilities of node cuts, given the observed leaf state, for every node in the network tree.

11. A system comprising:
data processing hardware; and
memory hardware in communication with the data processing hardware, the memory hardware storing instructions that when executed on the data processing hardware cause the data processing hardware to perform operations comprising:
receiving subscriber statuses of a plurality of customer premises equipment (CPE) of a communication network, the communication network comprising a network tree of communication paths between a root node and leaf nodes, each leaf node corresponding to a CPE, the network tree comprising sub-trees, each sub-tree comprising a sub-tree root node and one or more child nodes in communication with the sub-tree root node;
for each CPE:
determining a conditional probability of the subscriber status of the CPE for each sub-tree in the network tree, assuming a communication cut at the corresponding sub-tree root node;
determining a joint probability of the subscriber status of the CPE for every sub-tree in the network tree;
determining a joint probability of the subscriber status of the CPE for every residual tree in the network tree, each residual sub-tree being the network tree minus a sub-tree; and
determining a Bayesian posterior probability of a communication cut at each node, given the subscriber status of the CPE; and determining a network node status topology indicating node statuses of nodes of the network tree based on the determined Bayesian posterior probabilities.

12. The system of claim 11, wherein the operations further comprise:
receiving a heartbeat signal from each CPE; and
determining the subscriber status of each CPE based on the corresponding heartbeat signal of the CPE.

13. The system of claim 12, wherein the subscriber status comprises an operation state or a network state of the corresponding CPE.

14. The method of claim 11, wherein the operations further comprise:
determining a graphical representation of the network node status topology; and
displaying the graphical representation of the network node status topology on a screen in communication with the data processing hardware.

15. The system of claim 11, wherein the operations further comprise issuing a network correction command based the determined network node status topology, the network correction command associated with at least one node of the network tree having a fault status.

16. The system of claim 11, wherein the communication network comprises a passive optical network and the customer premise equipment comprises optical line terminals.

17. The system of claim 11, wherein at least one node of the network tree corresponds to a passive optical device.

18. The system of claim 11, wherein determining the conditional probability of the subscriber status of the CPE for each sub-tree in the network tree or determining the joint probability of the subscriber status of the CPE for every sub-tree in the network tree comprises:
receiving a first input set comprising:
a node map defining pathways between node indices and leaf indices, wherein the nodes are assumed to be breadth-first-search ordered;
a first vector defining an observed leaf state;
a second vector defining prior probabilities;
a third vector defining child indices of each node;
a true-positive-rate associated with the observed leaf state; and
a true-negative-rate associated with the observed leaf state; and
determining based on the first input set:
a fourth vector defining a conditional log-likelihood of the observed leaf state for every sub-tree assuming a communication cut in the sub-tree root node of the corresponding sub-tree; and
a fifth vector defining a log-likelihood of the observed leaf state for every sub-tree in the network tree.

19. The system of claim 18, wherein determining the joint probability of the subscriber status of the CPE for every residual tree in the network tree comprises calculating:
receiving a second input set comprising:
the second vector;
the third vector
the fourth vector;
the fifth vector; and
a sixth vector defining a parent index of each node; and
determining based on the second input set a seventh vector defining the log-likelihood of the observed leaf state for every residual tree in the network tree.

20. The system of claim 19, wherein determining the Bayesian posterior probability of the communication cut at each leaf node comprises calculating:
receiving a third input set comprising:
the first vector;
the second vector;
the third vector
the fourth vector;
the fifth vector;
the sixth vector; and
the seventh vector; and
determining based on the third input set an eighth vector defining Bayesian posterior probabilities of node cuts, given the observed leaf state, for every node in the network tree.

* * * * *